(12) United States Patent
Sato et al.

(10) Patent No.: US 10,591,332 B2
(45) Date of Patent: Mar. 17, 2020

(54) AIRFLOW METER

(71) Applicant: HITACHI AUTOMOTIVE SYSTEMS, LTD., Hitachinaka-shi, Ibaraki (JP)

(72) Inventors: Ryo Sato, Hitachinaka (JP); Masahiro Matsumoto, Tokyo (JP); Satoshi Asano, Tokyo (JP); Akira Kotabe, Hitachinaka (JP); Kazunori Suzuki, Hitachinaka (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 108 days.

(21) Appl. No.: 15/754,477

(22) PCT Filed: Jul. 27, 2016

(86) PCT No.: PCT/JP2016/071944
§ 371 (c)(1),
(2) Date: Feb. 22, 2018

(87) PCT Pub. No.: WO2017/038312
PCT Pub. Date: Mar. 9, 2017

(65) Prior Publication Data
US 2018/0252565 A1    Sep. 6, 2018

(30) Foreign Application Priority Data

Aug. 31, 2015  (JP) ................................. 2015-169972

(51) Int. Cl.
*G01F 1/696* (2006.01)
*G01F 1/00* (2006.01)
(Continued)

(52) U.S. Cl.
CPC ................ *G01F 1/696* (2013.01); *G01F 1/00* (2013.01); *G01F 1/68* (2013.01); *G01F 1/688* (2013.01);
(Continued)

(58) Field of Classification Search
CPC ........ G01F 1/696; G01F 1/698; G01F 1/6965; G01F 15/04; G01F 5/00; G01F 1/6847;
(Continued)

(56) References Cited

U.S. PATENT DOCUMENTS 6,904,379 B1 * 6/2005 Hanzawa .............. G01F 1/6965
                                                          702/106
8,813,556 B2 * 8/2014 Matsumoto ........... G01F 1/6842
                                                          73/204.11
(Continued)

FOREIGN PATENT DOCUMENTS

CN    1451093 A    10/2003
EP    1 316 781 A1   6/2003
(Continued)

OTHER PUBLICATIONS

Extended European search report issued in the corresponding European Application No. 16841344.1.
(Continued)

*Primary Examiner* — Freddie Kirkland, III
(74) *Attorney, Agent, or Firm* — Foley & Lardner LLP

(57) ABSTRACT

Provided is an airflow meter with good precision. In the airflow meter, which is provided with an arithmetic circuit that incorporates air temperature and a sensor module temperature as adjustment elements for the output characteristics of the airflow meter, corrects the output characteristics in accordance with the temperature difference between the air temperature and the sensor module temperature and reduces the correction amount when the absolute value of
(Continued)

the difference between the air temperature and the sensor module temperature is small.

6 Claims, 9 Drawing Sheets

(51) Int. Cl.
  *G01F 1/68* (2006.01)
  *G01F 1/698* (2006.01)
  *G01F 1/684* (2006.01)
  *G01F 1/688* (2006.01)
  *G01F 5/00* (2006.01)
  *G01F 15/04* (2006.01)

(52) U.S. Cl.
  CPC .......... *G01F 1/6842* (2013.01); *G01F 1/6847* (2013.01); *G01F 1/698* (2013.01); *G01F 1/6965* (2013.01); *G01F 5/00* (2013.01); *G01F 15/04* (2013.01)

(58) Field of Classification Search
  CPC .......... G01F 1/6842; G01F 1/688; G01F 1/00; G01F 1/68
  See application file for complete search history.

(56) References Cited

U.S. PATENT DOCUMENTS

| | | | |
|---|---|---|---|
| 9,939,300 B2* | 4/2018 | Asano | ..................... G01F 1/692 |
| 2016/0011031 A1* | 1/2016 | Asano | ..................... G01F 1/692 |
| | | | 73/114.34 |

FOREIGN PATENT DOCUMENTS

| | | |
|---|---|---|
| JP | S62-018708 U1 | 2/1987 |
| JP | H02-281108 A | 11/1990 |
| JP | 2010-216906 A | 9/2010 |
| WO | WO-2014/136468 A1 | 9/2014 |

OTHER PUBLICATIONS

Office Action issued in corresponding Chinese Application No. 201680049796.7 dated Jan. 28, 2019.

International Search Report with English translation and Written Opinion issued in corresponding application No. PCT/JP2016/071944 dated Nov. 15, 2016.

* cited by examiner

AIRFLOW METER

TECHNICAL FIELD

The present invention relates to an apparatus for measuring a flow rate of a gas to be measured, and more particularly to an air flow meter for measuring the flow rate of intake air of an internal combustion engine of an automobile.

BACKGROUND ART

A method for correcting a temperature characteristic of an air flow meter for an automobile includes a technique described in JP 2010-216906 A (PTL 1). This publication includes a description that "air temperature and sensor module temperature are incorporated as adjustment factors of output characteristics and perform temperature correction of the output characteristics according to a difference between the air temperature and the sensor module temperature".

CITATION LIST

Patent Literatures

PTL 1: JP 2010-216906 A

SUMMARY OF INVENTION

Technical Problem

While PTL 1 describes that the air temperature and the sensor module temperature are individually detected by two temperature sensors, and correction is performed according to a difference between the detected temperatures, there is no contemplation of an influence of a temperature difference due to a difference in a degree of deterioration by aging between the two temperature sensors and the influence of a temperature difference due to individual characteristic variations in the temperature sensors. This would cause generation of an error in the output of the air flow meter in a case where two different temperature sensors output mutually different temperatures for a same temperature due to the difference in the degree of deterioration by aging and the characteristic variations.

An object of the present invention is to provide a highly accurate air flow meter.

Solution to Problem

In order to solve the above-described problem, a representative air flow meter of the present invention includes an arithmetic circuit that corrects an output, in which the arithmetic circuit incorporates an air temperature and a sensor module temperature as adjustment factors for an output characteristic of the air flow meter, the output characteristic is corrected in accordance with a temperature difference between the air temperature and the sensor module temperature, and a correction amount is decreased when an absolute value of the difference between the air temperature and the sensor module temperature is small.

Advantageous Effects of Invention

According to the present invention, it is possible to provide a highly accurate air flow meter.

DESCRIPTION OF EMBODIMENTS

Exemplary embodiments of the present invention will now be described with reference to the accompanying drawings.

First Exemplary Embodiment

Figure 1:
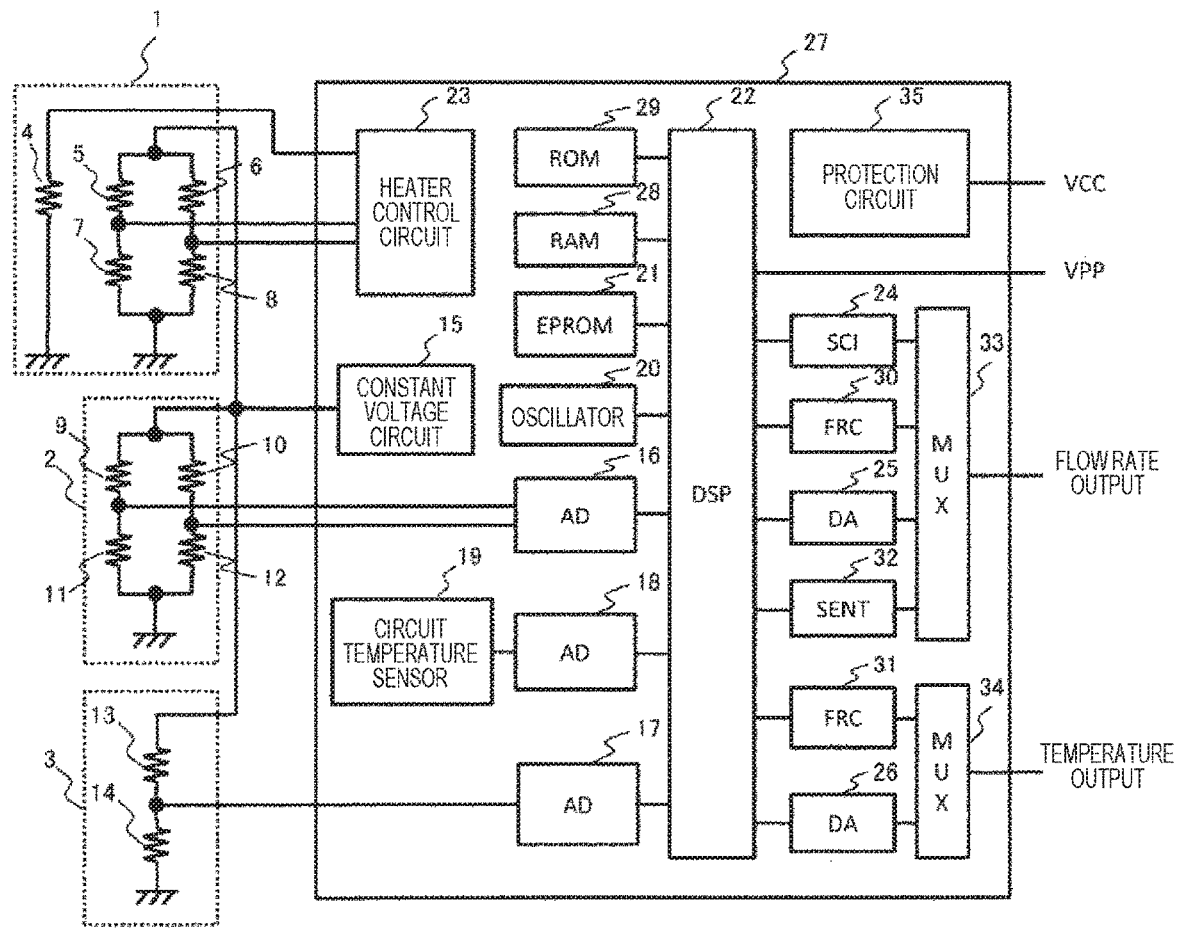
FIG. 1 is a circuit configuration diagram of an air flow meter for an automobile according to the present invention.

FIG. 1 is a circuit configuration of an air flow meter according to the present invention. A constant temperature control bridge 1 is constituted with a heating resistor 4, a bridge circuit temperature measurement resistance temperature detector 5, an intake air temperature compensating resistance temperature detector 6, and fixed resistors 7 and 8. A heater control circuit 23 controls a current flowing to the heating resistor 4 so as to achieve a constant temperature difference between the bridge circuit temperature measurement resistance temperature detector 5 and the intake air temperature compensating resistance temperature detector 6.

A temperature difference bridge 2 that detects the amount of heat emitted from the heating resistor 4 is arranged around the heating resistor 4 of the constant temperature control bridge 1. The temperature difference bridge 2 is constituted with resistance temperature detectors 9 to 12, and capable of detecting an air flow rate and a direction.

An intake air temperature sensor 3 that measures an air temperature is constituted with a fixed resistor 13 and a temperature sensitive resistor 14 having a resistance value changing in accordance with the temperature.

A flow rate signal detected by the temperature difference bridge 2 has variations among individual circuits, and thus needs to be adjusted to a target output characteristic. The output of the intake air temperature sensor 3 also needs to be adjusted to a target characteristic.

Examples of a method of adjusting to the target output characteristic includes adjustment by a polynomial of second order or higher and adjustment by a correction map. Adjustment is performed in a state of being connecting with an external computer.

An output characteristic adjustment circuit 27 is an LSI circuit integrating a heater control circuit and an arithmetic function, and includes an oscillator (hereinafter referred to as OSC) 20 for driving the whole circuit, a heater control circuit 23 that controls the constant temperature control bridge 1, the constant temperature control bridge 1, the temperature difference bridge 2, a constant voltage circuit 15 as a power source for driving the intake air temperature sensor 3 and the output characteristic adjustment circuit 27, a circuit temperature sensor 19 that detects the temperature of the circuit, an A/D converter 16 that converts an air flow rate signal, an A/D converter 17 that converts an output signal of the intake air temperature sensor 3, an A/D converter 18 that converts an output signal of the circuit temperature sensor 19, an arithmetic circuit (digital signal processor, hereinafter referred to as DSP) 22 that corrects an air flow rate signal and an intake air temperature sensor signal, D/A converters 25 and 26 that convert a digital output value calculated by the DSP 22 to a voltage value, free running counters (hereinafter, referred to as FRC) 30 and 31 that perform conversion to frequency, an SENT 32 as a digital output, a communication circuit (serial communication interface, hereinafter referred to as an SCI) 24 that communicates with an external computer for performing output adjustment, multiplexers (hereinafter referred to as MUX) 33 and 34 that switch an output mode, a storage circuit (EPROM, for example) 21 to which adjustment data is written, a ROM 29 that stores a program that controls the DSP 22, a RAM 28 that temporarily stores intermediate data in calculation by the DSP 22, and a protection circuit 35 that protects the circuit when an excessive surge is applied to a power supply VCC.

Figure 2:
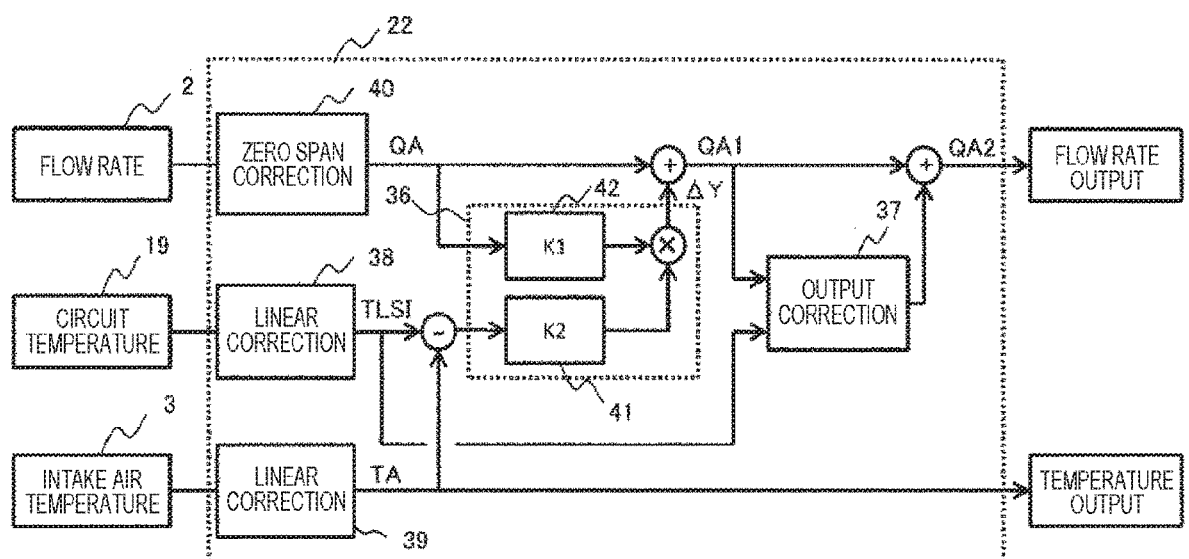
FIG. 2 is a block diagram of an arithmetic system mounted inside a DSP in FIG. 1.

FIG. 2 is a circuit block diagram illustrating an output adjustment function executed by the DSP 22.

An output of the temperature difference bridge 2, an output of the circuit temperature sensor 19, and an output of the intake air temperature sensor 3 as input signals are incorporated as adjustment factors of an output characteristic. Adjustment is initially performed such that the output of the circuit temperature sensor 19 is adjusted by linear correction 38, and the output of the intake air temperature sensor 3 is adjusted by linear correction 39 so as to achieve a same target value. The value used for adjustment can be arbitrarily set, and it is desirable to set the temperature and the target value in a linear relationship. Next, zero point adjustment and span adjustment are applied to the output of the temperature difference bridge 2 in a zero span correction 40.

Next, characteristic correction in a state where there is a difference between the circuit temperature and intake air temperature (wall temperature state) is performed in wall temperature correction 36. The wall temperature correction 36 multiplies a difference (TA−TLSI) between the corrected output (TLSI) of the circuit temperature sensor 19 and the corrected output (TA) of the intake air temperature sensor 3 by an optimum constant (K1) 42 different for each of flow rates. Furthermore, a wall temperature correction amount (ΔY) is obtained by multiplying K1 by a gain (K2) 41 corresponding to TA−TLSI and added to a zero span adjusted flow rate signal (QA) of the output of the temperature difference bridge 2. The calculation formula executed by the wall temperature correction 36 is illustrated in (1).

$$QA1 = QA + K1 \times K2 \times (TA-TLSI) \qquad (1)$$

Finally, the correction according to the corrected output (TLSI) of the circuit temperature sensor 19 is performed using data of an output correction map 37 so as to correct a flow rate signal (QA1) after correction of the wall temperature, and adjusts the flow rate signal to the target value. At the same time, the corrected output (TA) of the intake air temperature sensor 3 is output as a temperature signal. Moreover, this correction can be compatible not only with correction by a map but also with correction by polynomial. The merit of performing correction by polynomial is that it is sufficient to prepare a small capacity for the storage circuit 21 and the ROM 29. With small capacity, it is possible to reduce the chip size and the cost. The merit of performing correction by a map is its capability of coping with a sharp change of the correction amount with respect to the input and its capability of achieving high accuracy.

Figure 3:
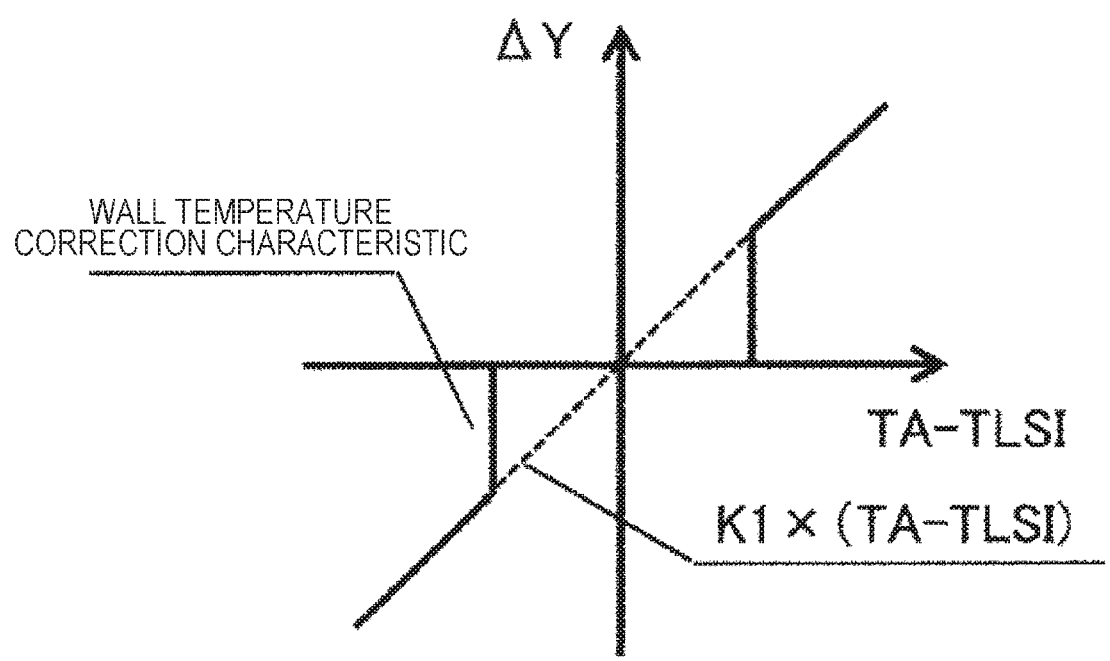
FIG. 3 is a correction characteristic diagram of a wall temperature correction unit according to a first exemplary embodiment.

FIG. 3 illustrates a characteristic diagram of the correction amount ΔY output from the wall temperature correction 36. ΔY indicates zero until an absolute value (|TA−TLSI|) of the difference (TA−TLSI) between the corrected output (TLSI) of the circuit temperature sensor 19 and the corrected output (TA) of the intake air temperature sensor 3 reaches a threshold, and indicates a primary characteristic of a gradient K1 with the threshold as a boundary.

Figure 4:
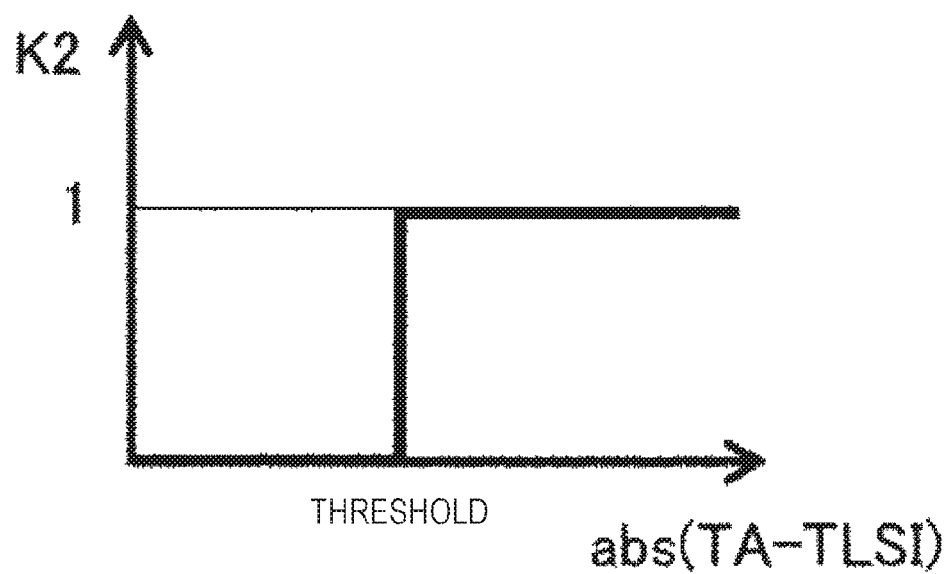
FIG. 4 is a characteristic diagram of region setting of a wall temperature correction characteristic according to the first exemplary embodiment.

FIG. 4 illustrates a characteristic diagram of the gain (K2) 41. The diagram illustrates a characteristic of a step response of zero (0) and one with the threshold as a boundary. This threshold can be arbitrarily set, and is desirably set in consideration of the degree of deterioration by aging and characteristic variation in the circuit temperature sensor and the intake air temperature sensor.

Second Exemplary Embodiment

The present embodiment is applied to a case of a circuit configuration described in the first exemplary embodiment having a different correction characteristic, implemented in the wall temperature correction 36.

Figure 5:
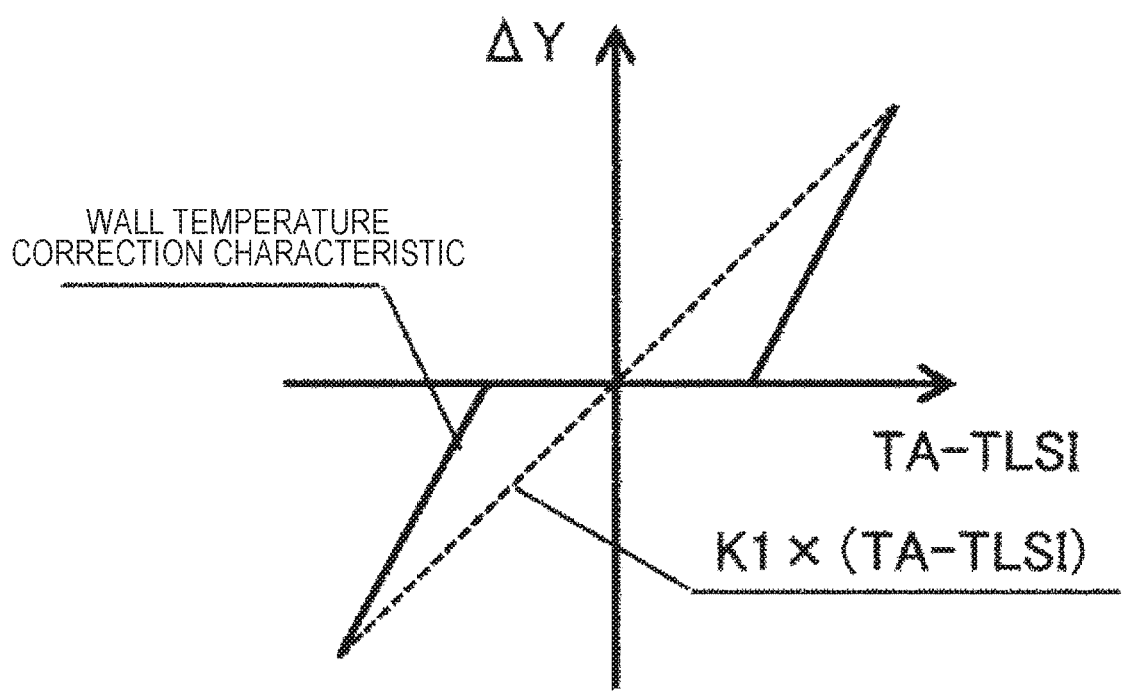
FIG. 5 is a correction characteristic diagram of a wall temperature correction unit according to a second exemplary embodiment.

FIG. 5 illustrates a characteristic diagram of the correction amount ΔY output from the wall temperature correction 36. ΔY indicates zero until an absolute value (|TA−TLSI|) of the difference (TA−TLSI) between the corrected output (TLSI) of the circuit temperature sensor 19 and the corrected output (TA) of the intake air temperature sensor 3 reaches a threshold, and indicates the primary characteristic approaching the gradient K1 with the threshold as a boundary.

Figure 6:
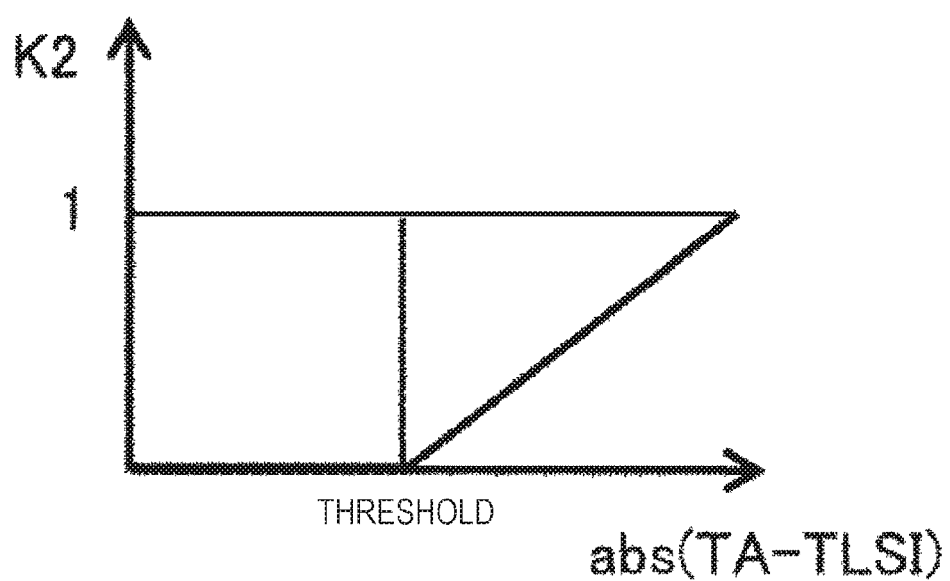
FIG. 6 is a characteristic diagram of a region setting of a wall temperature correction characteristic according to the second exemplary embodiment.

FIG. 6 illustrates a characteristic diagram of the gain (K2) 41. The gain is zero until threshold, and illustrates a primary characteristic on and after the threshold.

This configuration has an advantage of suppressing characteristic variation at discontinuous points before and after the threshold.

Third Exemplary Embodiment

The present embodiment is applied to a case of a circuit configuration described in the first exemplary embodiment having a different correction characteristic, implemented in the wall temperature correction 36.

Figure 7:
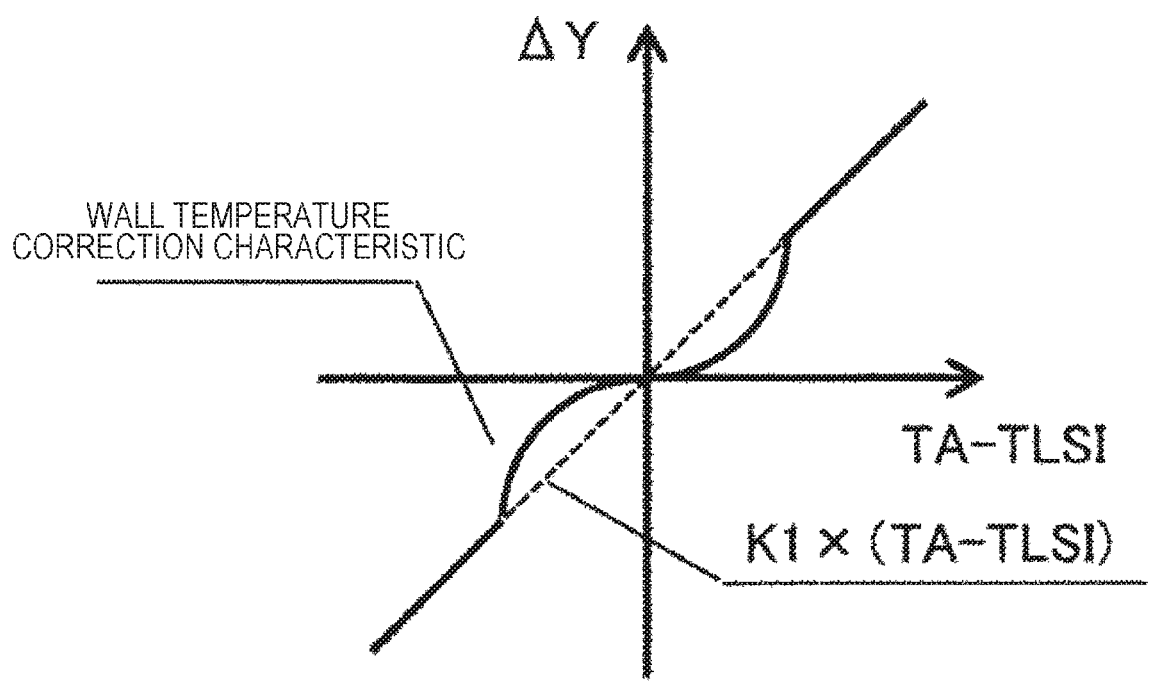
FIG. 7 is a correction characteristic diagram of a wall temperature correction unit according to a third exemplary embodiment.

FIG. 7 illustrates a characteristic diagram of the correction amount ΔY output from the wall temperature correction 36. ΔY indicates a secondary characteristic until the absolute value (|TA−TLSI|) of the difference (TA−TLSI) between the corrected output (TLSI) of the circuit temperature sensor 19 and the corrected output (TA) of the intake air temperature sensor 3 reaches a threshold, and indicates the primary characteristic with the threshold as a boundary.

Figure 8:
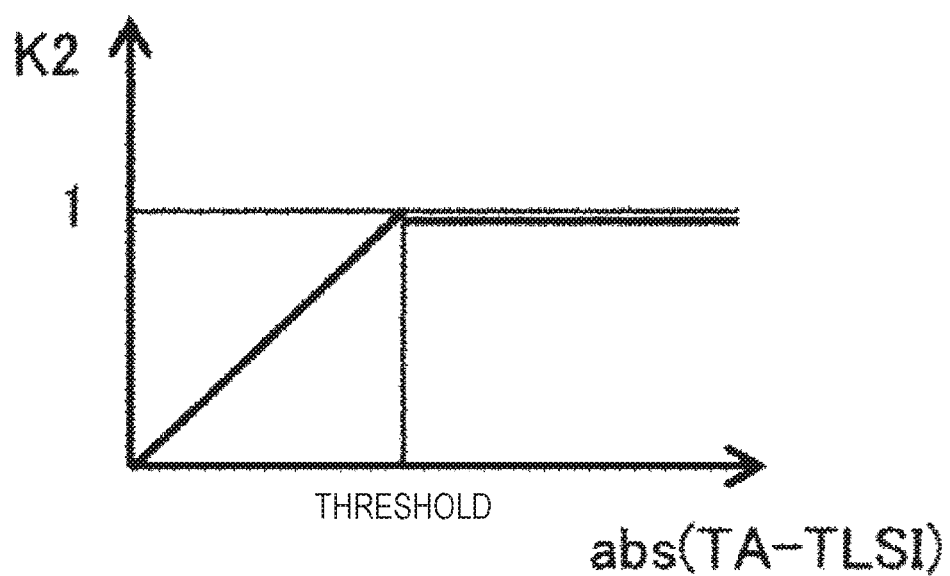
FIG. 8 is a characteristic diagram of region setting of a wall temperature correction characteristic according to the third exemplary embodiment.

FIG. 8 illustrates a characteristic diagram of the gain (K2) 41. The gain indicates the primary characteristic until the threshold, and indicates a characteristic of K2=1 with the threshold as a boundary.

This configuration has an advantage of suppressing characteristic variation before/after the threshold and achieving the primary characteristic with the gradient K1 on and after the threshold.

Fourth Exemplary Embodiment

The present embodiment is applied to a case of a circuit configuration according to the first exemplary embodiment having a different correction characteristic, implemented in the wall temperature correction 36.

Figure 9:
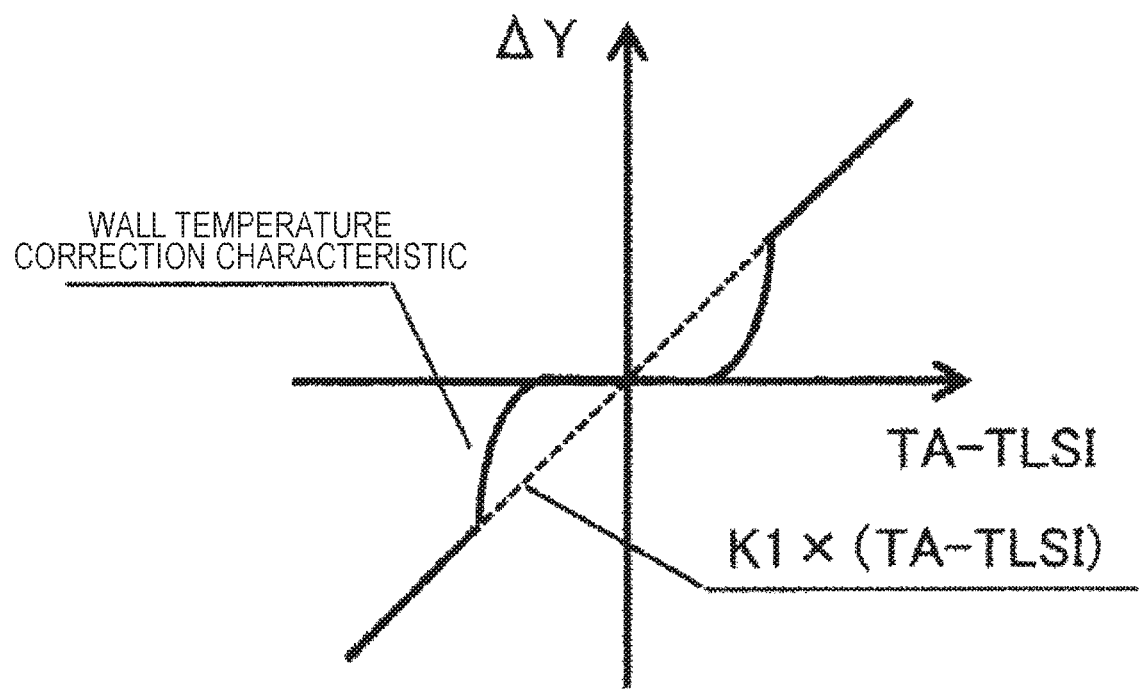
FIG. 9 is a correction characteristic diagram of a wall temperature correction unit according to a fourth exemplary embodiment.

FIG. 9 illustrates a characteristic diagram of the correction amount ΔY output from the wall temperature correction 36. ΔY indicates zero until the absolute value (|TA−TLSI|) of the difference (TA−TLSI) between the corrected output (TLSI) of the circuit temperature sensor 19 and the corrected output (TA) of the intake air temperature sensor 3 reaches a threshold 1, indicates the secondary characteristic from the threshold 1 until a threshold 2, and indicates the primary characteristic on and after the threshold 2.

Figure 10:
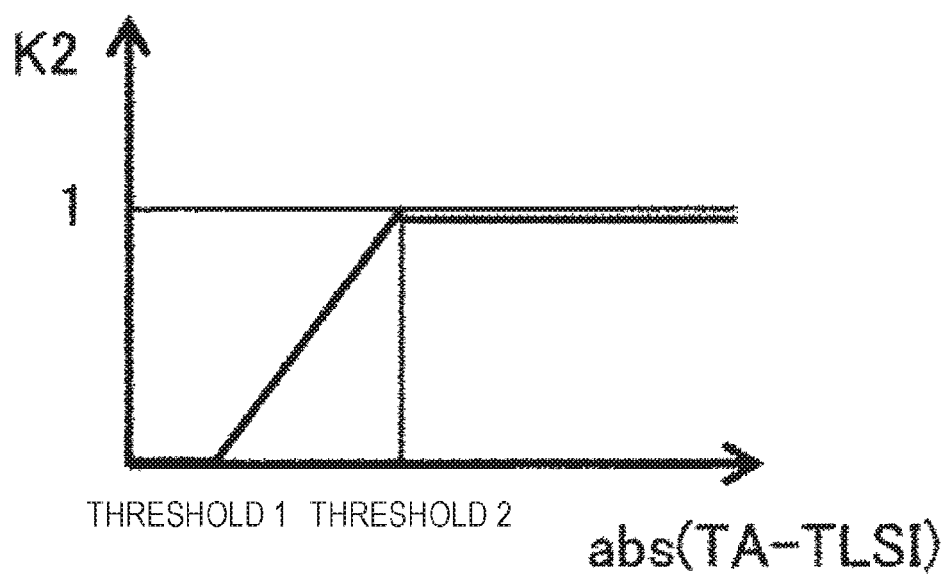
FIG. 10 is a characteristic diagram of region setting of a wall temperature correction characteristic according to the fourth exemplary embodiment.

FIG. 10 illustrates a characteristic diagram of the gain (K2) 41. The gain indicates zero until the threshold 1, indicates the primary characteristics from the threshold 1 until the threshold 2, and indicates characteristic of K2=1 on and after the threshold 2.

This configuration has an advantage of suppressing characteristic variation before/after the threshold 1 and threshold 2 and achieving the primary characteristic with the gradient K1 on and after the threshold 2.

The present invention is not limited to the above-described exemplary embodiments, but may include various types of modification. For example, the above-described exemplary embodiments give detailed explanation just to allow the present invention to be clearly understood. Therefore, the present invention is not limited to the case having all of components in the configuration. In addition, a portion of configuration of an exemplary embodiment can be replaced with a portion of configuration of another exemplary embodiment. A portion or the configuration of another exemplary embodiment can be added to a certain exemplary embodiment. Moreover, regarding the portions of the configuration of each of the exemplary embodiments, addition, deletion, and replacement from another configuration would be possible. Moreover, the above configurations, functions, processing units, processing means, or the like, may be implemented by hardware by designing a portion or all with an integrated circuit, for example. Moreover, each of the above-described configurations, functions, or the like, may be implemented with software by a processor by interpreting and executing a program designed to realize individual functions. Information such as programs, maps, correction values that realize individual functions can be stored in a storage apparatus such as a memory, a ROM, an EPROM, and a flash memory.

REFERENCE SIGNS LIST 1 constant temperature control bridge
2 temperature difference bridge
3 intake air temperature sensor
4 heating resistor
5 to 6 resistance temperature detector
7 to 8, 13 fixed resistor
9 to 12 resistance temperature detector
14 temperature sensitive resistor
15 constant voltage circuit
16 to 18 A/D converter
19 circuit temperature sensor
21 storage circuit
22 DSP
23 heater control circuit
24 SCI
25 to 26 D/A converter
27 output characteristic adjustment circuit
28 RAM
29 ROM
30 to 31 FRC
32 SENT
33 to 34 MUX
35 protection circuit
36 wall temperature correction
37 output correction
38 to 39 linear correction
zero span correction

The invention claimed is:

1. An air flow meter comprising an arithmetic circuit that corrects an output, wherein:
the arithmetic circuit is configured to incorporate an air temperature and a sensor module temperature as adjustment factors for an output characteristic of the air flow meter,
the output characteristic is corrected in accordance with a temperature difference between the air temperature and the sensor module temperature, and
a correction amount is decreased in comparison to a correction amount indicated by a primary characteristic when an absolute value of the difference between the air temperature and the sensor module temperature is smaller than a threshold.

2. The air flow meter according to claim 1,
wherein the correction amount of the output characteristic includes a first region and a second region having different change rates of the correction amount.

3. The air flow meter according to claim 2,
wherein the first region has a change rate of the correction amount smaller than a change rate of the second region.

4. The air flow meter according to claim 2,
wherein the change rate of the correction amount with respect to the temperature difference between the air temperature and the sensor module temperature is zero in the first region, and
the change rate in the second region has the primary characteristic.

5. The air flow meter according to claim 2,
wherein the change rate of the correction amount with respect to the temperature difference between the air temperature and the sensor module temperature indicates a secondary characteristic in the first region, and
the change rate in the second region has the primary characteristic.

6. The air flow meter according to claim 2,
wherein the change rate of the correction amount with respect to the temperature difference between the air temperature and the sensor module temperature is zero in the first region until the absolute value of the difference between the air temperature and the sensor module temperature reaches a first threshold, and the change rate in the second region has a secondary characteristic until the absolute value of the difference between the air temperature and the sensor module temperature reaches a second threshold.

* * * * *